(12) United States Patent
Lepeshkin et al.

(10) Patent No.: US 11,725,732 B2
(45) Date of Patent: Aug. 15, 2023

(54) SEAL BETWEEN MUTUALLY FIXED SURFACES

(71) Applicants: NFS LOGISTICS, JOINT-STOCK COMPANY (NFCL JSC), Moscow (RU); SCIENCE AND INNOVATIONS -NUCLEAR INDUSTRY SCIENTIFIC DEVELOPMENT, PRIVATE ENTERPRISE, Moscow (RU)

(72) Inventors: Aleksey Yur'evich Lepeshkin, g. Dimitrovgrad (RU); Andrei Valer'evich Sokolov, g. Dimitrovgrad (RU); Andrei Viktorovich Vildeev, g. Dimitrovgrad (RU)

(73) Assignees: NFC LOGISTICS, JOINT-STOCK COMPANY (NFCL JSC), Moscow (RU); SCIENCE AND INNOVATIONS -NUCLEAR INDUSTRY SCIENTIFIC DEVELOPMENT, PRIVATE ENTERPRISE, Moscow (RU)

( * ) Notice: Subject to any disclaimer, the term of this patent is extended or adjusted under 35 U.S.C. 154(b) by 0 days.

(21) Appl. No.: 17/256,581

(22) PCT Filed: Dec. 29, 2018

(86) PCT No.: PCT/RU2018/000910
§ 371 (c)(1),
(2) Date: Dec. 28, 2020

(87) PCT Pub. No.: WO2020/139122
PCT Pub. Date: Jul. 2, 2020

(65) Prior Publication Data
US 2021/0372524 A1    Dec. 2, 2021

(30) Foreign Application Priority Data

Dec. 28, 2018 (RU) .................................. 2018147148

(51) Int. Cl.
*F16J 15/08* (2006.01)

(52) U.S. Cl.
CPC .... *F16J 15/0818* (2013.01); *F16J 2015/0856* (2013.01)

(58) Field of Classification Search
CPC ............. F16J 15/0818; F16J 2015/0856; F16J 15/122; F16J 15/08
See application file for complete search history.

(56) References Cited

U.S. PATENT DOCUMENTS

| 2,134,868 A | * | 11/1938 | Fitzgerald | ............ F16J 15/0818 |
| | | | | 277/599 |
| 2,269,486 A | * | 1/1942 | Paula | ....................... F16L 17/08 |
| | | | | 277/612 |

(Continued)

FOREIGN PATENT DOCUMENTS

| JP | 57179469 A | * | 4/1981 | ........... F16J 15/0818 |
| JP | 11141686 A | * | 5/1999 | ............. F16J 15/064 |

(Continued)

*Primary Examiner* — Eugene G Byrd
(74) *Attorney, Agent, or Firm* — J. Miguel Hernandez; James R. Gourley; Carstens, Allen & Gourley, LLP

(57) ABSTRACT

Seal between mutually fixed surfaces comprises a metal ring, placed between graphite layers, where sections of the metal ring to be coated with graphite have a jagged profile. Both sides of the metal ring are coated with graphite in such a way that graphite layers and the metal ring form a seamless whole. Recesses are made in the seal on both sides between graphite rings, a hole is placed in their centre.

4 Claims, 2 Drawing Sheets

(56) References Cited

U.S. PATENT DOCUMENTS

| | | | | |
|---|---|---|---|---|
| 2,543,963 | A * | 3/1951 | Gaffin | F16L 23/20 277/649 |
| 2,699,349 | A * | 1/1955 | Brownlee | F16J 15/0818 277/654 |
| 2,980,572 | A * | 4/1961 | Warren | F16J 15/0825 156/305 |
| 3,269,373 | A * | 8/1966 | Bondroit | F16J 15/0818 418/83 |
| 5,172,920 | A * | 12/1992 | Schlenk | F16J 15/122 277/924 |
| 5,421,594 | A * | 6/1995 | Becerra | F16J 15/122 277/627 |
| 6,565,099 | B1 * | 5/2003 | Ottinger | B32B 27/08 277/592 |
| 8,684,363 | B2 * | 4/2014 | Krejci | F16J 15/122 277/609 |
| 9,121,489 | B1 * | 9/2015 | Tosa | F16J 15/0887 |
| 10,107,400 | B2 * | 10/2018 | Lee | F16J 15/104 |
| 10,907,735 | B2 * | 2/2021 | Takeuchi | F16J 15/122 |
| 2005/0200085 | A1 * | 9/2005 | Kasuya | F16J 15/0825 277/628 |
| 2006/0012077 | A1 * | 1/2006 | Salameh | F16J 15/0818 264/161 |
| 2008/0191425 | A1 * | 8/2008 | Gasch | F16J 15/0825 277/593 |
| 2012/0112420 | A1 * | 5/2012 | Stetter | F16J 15/0818 72/462 |
| 2015/0198250 | A1 * | 7/2015 | Hoehe | F16J 15/0818 277/641 |
| 2016/0348817 | A1 * | 12/2016 | Veiga | F16J 15/065 |
| 2017/0074437 | A1 * | 3/2017 | Briggs | F16J 15/122 |
| 2018/0135754 | A1 * | 5/2018 | Veiga | F16J 15/0818 |
| 2019/0271397 | A1 * | 9/2019 | Heuschmid | F16J 15/0881 |
| 2022/0074496 | A1 * | 3/2022 | Watanabe | F16J 15/0831 |
| 2022/0228663 | A1 * | 7/2022 | Zhao | F16J 15/0818 |

FOREIGN PATENT DOCUMENTS

| | | | | |
|---|---|---|---|---|
| JP | 2005201438 A | * | 7/2005 | B21D 13/02 |
| JP | 2008223952 A | * | 9/2008 | F16J 15/0818 |
| RU | 2184895 C1 | * | 7/2002 | |
| RU | 2377459 C1 | * | 12/2009 | F16J 15/061 |
| RU | 2482362 C2 | * | 5/2013 | F16J 15/122 |
| RU | 2641987 C1 | * | 1/2018 | |

* cited by examiner

SEAL BETWEEN MUTUALLY FIXED SURFACES

CROSS-REFERENCE TO RELATED DISCLOSURE

This application is a U.S. National Stage of International Application No. PCT/RU2018/000910, filed on Dec. 29, 2018, and published as WO 2020/139122 on Jul. 2, 2020, titled "Seal Between Mutually Fixed Surfaces," which claims priority to RU 2018147148 filed on Dec. 28, 2018. Each application, publication, and patent listed in this paragraph are hereby incorporated by reference in their entireties.

TECHNICAL FIELD OF THE INVENTION

The invention is related to sealing devices and it can be used to seal protective lids in casks (containers) for transportation and/or long-term storage of radioactive materials, as well as for sealing flange joints in pipes, fittings, pressure vessels, etc.

PRIOR ART

A sealing fixture (WO 3054427 A1) is known, made as a ring element produced of elastically deformable material, surface of which is covered with protective film made of material containing 50% or more acrylonitrile. Acrylonitrile (polyacrylonitrile) is characterized by low elasticity, low cold resistance properties, so its application as a seal is limited. It's also necessary to note its low dielectric properties.

Sealing fixture (WO 3016756 A2) is known, having the first section made of elastically deformable material and the second section made of material that is fuel vapour impermeable. The first and second sections of this fixture are connected by any mechanical fastener or by any binders. Availability of mechanical fastener made the design of sealing fixture more complicated, application of binder for sure shall have an impact on sealing properties of the fixture.

Multilayer flat sealing gasket (U.S. Pat. No. 6,565,099) is known, having central element made of polymeric or elastic filament-reinforced material which can resist temperature up to 150° C. External surfaces of this element are completely covered by a shell made of organic air-tight polymer material. The mentioned gasket is characterized by low thermal resistance.

A seal located between surfaces that are fixed relative to each other (RU 2184895) is known, made as a spiral wound gasket, comprising alternating strips of profiled metal band and filler, where metal band on spiral section located between the layers of filler has non-continuous edges that form recesses, made to be filled, if required, by the filling material when the gasket is in operation condition. Complexity to produce such gaskets with the diameter more than 1.5 meters can be referred to disadvantages of the seal (seals with the diameter up to 2.0 meters are required for shipping packages that transport spent nuclear waste).

Flat seals (RU 22737778) are known, having metal layer, that is made at least, in the area of a hole with shoulder (collar) and wavy or jagged profile, made in the area near the indicated shoulder.

Spring steel or steel that is deformed in cold state, and then it is hardened with further tempering is taken as material to produce the seal. Profile is used to limit strain of shoulder, which is formed around the hole, and simultaneously it performs sealing function. To obtain the required elasticity, rigidity and preferable level of plastic deformation in different areas of the seal, it's possible to change intervals between peaks of waves or teeth and/or their height and/or radii of separate waves. For example, area of the profile located near a hole, may have the least intervals between back of waves or teeth than the more remote areas have. So, elasticity in this area should be less than in thoroughly filled areas of the profile. Production of such gaskets requires application of special tools and it's rather labour intensive.

The sealing gasket (RU 2377459) for flat flange joints with circular metal base and gaskets made of soft material on both sides, preferably graphite or polytetrafluoroethylene is well known, where base is made with radial-circular teeth, at least one of which can be plastically strained during installation, with that, thickness of the base, measured at the tooth peaks, is 1.35 mm, circular teeth have interval between each of two neighbouring circular teeth that is less than 3 mm. Teeth of the metal base are characterized by elasticity that provides original height after de-assembling of the seals from flanges.

Disadvantage of such gasket is related to a possibility of plastic damage of gasket teeth by considerable deviation of flanges surfaces from planarity (flanges deformation), as well as complexity of producing gaskets with large diameters and possibility of fast wear of soft gasket on tooth peaks.

A flat comb sealing gasket is known with two-way overlays for sealing removable flange joints (RU 2482362), containing two compacting contact surfaces, in which concentric V-shaped grooves at 90° angle are made, and on both compacting contact surfaces of the comb sealing gaskets between the grooves are created lying in one plane concentric surfaces of constant width from 0.2 mm to 0.6 mm, with the bottom of the cavities of concentric grooves performed with a rounding radius of 0.3 mm-0.5 mm and both sealed contact surfaces of the comb pads are superimposed with a sealing film or sealing plate made, for example, from graphite, and concentric grooves in the compacting contact surfaces of the comb gasket have less volume than the volume of the sealing film or the sealing plate, which overlaps the peaks of the extreme grooves in the compacting contact surfaces.

During installation, sealing layers of soft material are partly compacted in the clearance between flanges and they get into wave hollows, where density of sealing material required for tightness is provided in the closed volume. However, gaskets under high pressure and where flanges are deformed, pressure is uneven along the circumference of gasket, so metal ring waves can be expanded and crushed flat without any possibility for further restoration, leaving the sealed material without any radial support, that may result in flange joint depressurization.

Sealing film or sealing gasket is not fixed on the surface of metal base that makes installation and assembly of the gasket more complicated.

Wave gasket (RU 2641987), which contains metal ring with wave cross section, located between graphite layers, is well known too. Though necessity to install successively two gaskets, to provide double barrier of tightness, shall result in appreciation of the design.

Sealing device (RU 2377459) is known, with circular metal base and gaskets made of soft material on both sides, preferably graphite or polytetrafluoroethylene. Base has radial-circular teeth, which, in assembled state, shall ensure linear metal contact. Metal base shall have thickness less than 0.5 mm, preferably 0.49 mm and even more preferably less than 0.3 mm. The base contains, at least, one circular tooth also in the area of gaskets made of soft material and sealing device has centering ring with corrugated or jagged cross section. Corrugations or teeth of centering ring have height that is less than that of circular teeth. Nevertheless, the gasket consists basically of three individual parts (two graphite rings and the base made of bended metal), so it would be difficult to perform installation and provide the required alignment, specially if the diameter of compacting surface is 1.5 . . . 2 meters, and if there is necessity to install two gasket consequently, so installation procedure gets even more complicated.

SUMMARY OF THE INVENTION

Peculiarity of seal operation in protective covers of shipping packages is high level of radiation and temperature impacts within the whole period of container operation, as well as high requirements to tightness of sealed joints in normal operation and emergency conditions. Possibility of emergencies should be taken into account in compliance with the requirements for the casks (containers) of the specified purpose stipulated by the regulatory documents of the RF and recommendations of IAEA (Safety rules for radioactive materials transportation. NP-053-04. Moscow, 2004; Rules for safe transportation of radioactive substances. Edition 2009, IAEA, Vienna, 2009). High level of deformation and tension state of the structure and high level of heating when cask (container) is exposed to the fire zone are referred to a number of factors that are specific for emergencies, which requires the sealing unit to have improved elastic properties and possibility to operate at high temperatures and deformation of the support elements of the compacted compound.

Task that should be solved by the requested invention is referred to production of seal (gasket) for internal and external lids (covers) of shipping packages, providing double tight barrier and possibility to monitor tightness in both circuits of the seal.

Technical result involves simplifying of installation procedure, provided that high level of tightness in internal and external lids (covers) of shipping packages is duly ensured.

This task can be solved and the specified technical result is achieved due to the fact that in the seal between the surfaces fixed relative to each other and containing a metal ring placed between graphite layers, sections of metal ring to be covered by graphite have a jagged profile, and graphite is applied as rings on both sides of the metal ring. Simultaneously, holes for seal fastening by screws shall be made, as well as holes for medium flow during drying process and when seal cavity is sealed, shall be provided. Each hole is placed in the middle of a recess, which is produced on both sides between graphite rings. Thermally expanded graphite is used as graphite.

Sections of the gasket to be coated by graphite have jagged profile that provides safe and guaranteed connection of graphite with metal, thus possibility to form any cavities, presence of which can result in loss of sealing, shall be avoided. Metal base shall be covered by graphite in such a way that layer of graphite and metal shall be integral. Monolithic type of the gasket is allowed to avoid any distortions during installation and assembling, so the process of installation and assembling can be simplified.

Due to availability of recess on both sides, the gasket can be divided into two parts, that allows to separate the seal into two circuits which, in turn, provides double barrier of tightness. There is no necessity to use two different gaskets accordingly, so it makes the design cheaper and more simple.

Presence of a gasket with double-sided recess in the design allows to monitor tightness of both circuits in the gasket and de-watering (dehydration) of the gasket can be carried out effectively.

Fastening of the gasket to the lid by screws allows to provide exact positioning of the gasket relative to the sealed surfaces during assembling process and it allows to transport the lid coupled with the gasket.

BRIEF DESCRIPTION OF DRAWINGS

Top view of the seal and cross section of the seal in points where holes for fastening the gasket by screws (A-A) are made and holes for medium flow during drying process and when gasket cavity is sealed (B-B) are shown on FIG. 1.

Fastening of the seal is shown on FIG. 2.

EMBODIMENT OF THE INVENTION

Figure 1:
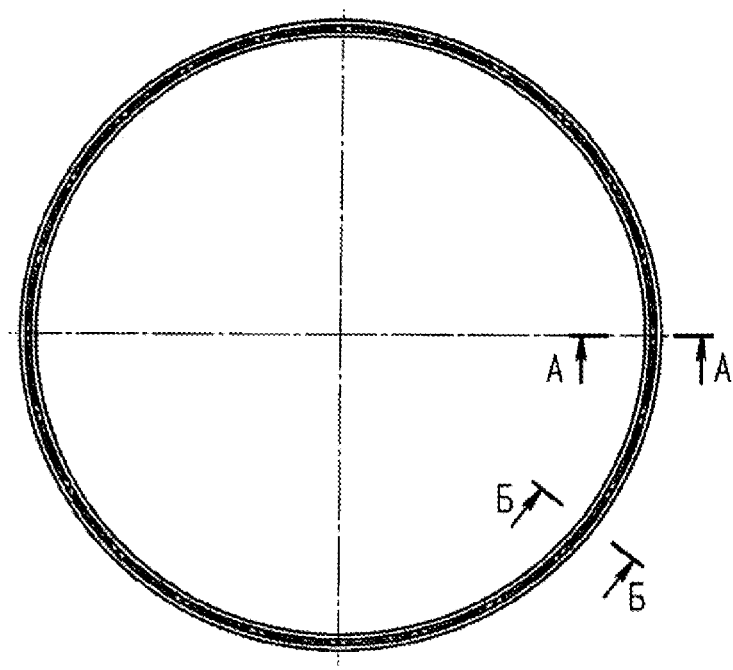
Figure 2:
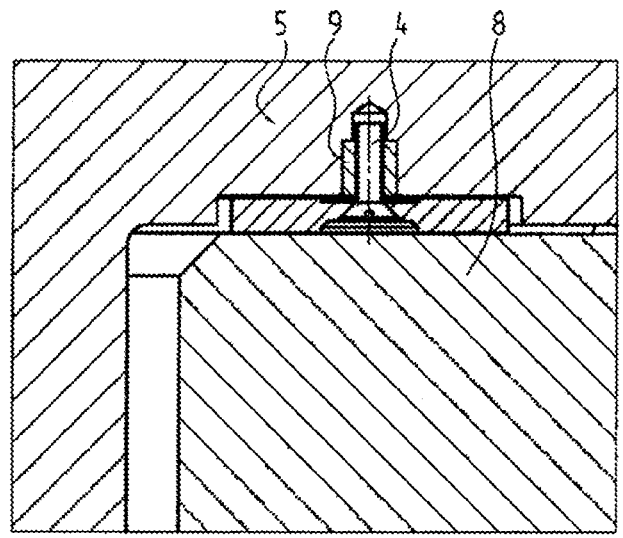
Figure 3:
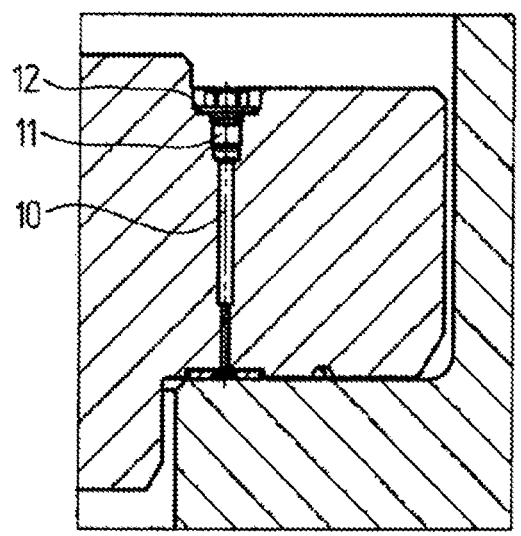

The seal is made of stainless steel ring 1, that is coated on both sides by thermally expanded graphite 2. Sections of the metal ring 1 to be coated by graphite 2, have jagged profile and graphite 2 is coated in the shape of rings on both sides of the metal ring 1. Height of teeth is from 0.3 to 0.5 mm, angle between teeth is 90°, thickness of graphite layer shall not exceed the height of teeth. Total thickness of the seal is from 3 to 6 mm.

The metal base shall be coated by graphite using known technologies in such a way that layer of graphite and metal base shall be integral.

Recess is made inside the seal on both sides and hole 3, designed to fasten the gasket by screws 4 in a groove of the lid 5, recess and hole 6 for medium flow during drying process and when gasket cavity is sealed.

The gasket shall be installed on lower surface of the lid 5 and fastened by screws 4, installed in holes 3 including recess in the gasket. Then the lid 5 shall be installed on the body 7 and fastened by pins and nuts (they are not shown on Fig.). The seal is ready for operation.

Test pressure shall be produced in cavity to monitor tightness through the hole 6, for this purpose, a hole connecting both parts of gasket with atmosphere is made in the lid 5. Hole outside the lid 5 shall be sealed by a plug with sealing ring made of thermally expanded graphite in operation condition. When tightness is monitored, a pipe connector shall be installed in hole 6, which can be connected to monitoring devices, for example, a pressure meter.

Recess also allows to perform de-watering (dehydration) of the seal.

INDUSTRIAL APPLICABILITY

Technical decision in compliance with the invention can be used to seal protective lids in casks (containers) for transportation and/or long-term storage of radioactive materials. The proposed seal shall provide tightness of protective lids in casks (containers) in normal operation and during emergencies in compliance with the requirements to casks (containers) of the specified purpose stipulated by the regulatory documents of the RF and recommendations of IAEA.

What is claimed is:

1. A seal assembly comprising a metal ring having or more holes, a first recess, and a second recess, wherein: the one or more holes extend from a first surface of the metal ring to a second surface of the metal ring, the first recess is located in the first surface and the second recess is located in the second surface, the first and second recesses are in communication with the one or more holes, the first and second recesses are concentric to the metal ring, and the first and second surfaces comprise a jagged portion; a first graphite layer and a second graphite layer, wherein the first graphite layer coats at least the jagged portion of the first surface of the metal ring, and wherein the second graphite layer coats at least the jagged portion of the second surface of the metal ring, whereby the metal ring and the first and second graphite layers form a unitary structure; a lid for a container, said lid comprising a lower surface, an upper surface, and one or more grooves, wherein the one or more grooves are formed in the lower surface of the lid;

and one or more screws securing the lid to the metal ring, wherein the one or more screws are inserted through the one or more holes and into the one or more grooves in the lower surface of the lid; wherein the first and second recesses divide the seal into two sections, thereby creating two circuits which increase a tightness of the seal, and wherein the first and second recesses prevent radial extrusion outside of the metal ring over and entire operating pressure range.

2. The seal of claim 1, wherein at least two screws and at least two holes fasten the seal to the lid.

3. The seal of claim 1, wherein at least one hole is designed for a medium flow during a drying process and when seal cavity tightness is monitored.

4. The seal of claim 1, wherein thermally expanded graphite is used as graphite, and wherein the first and second recesses form a triangular profile.

\* \* \* \* \*

UNITED STATES PATENT AND TRADEMARK OFFICE
CERTIFICATE OF CORRECTION

| | | |
|---|---|---|
| PATENT NO. | : 11,725,732 B2 | |
| APPLICATION NO. | : 17/256581 | |
| DATED | : August 15, 2023 | |
| INVENTOR(S) | : Aleksey Yur'evich Lepeshkin, Andrei Valer'evich Sokolov and Andrei Viktorovich Vildeev | |

It is certified that error appears in the above-identified patent and that said Letters Patent is hereby corrected as shown below:

In the Specification

In Column 4, Lines 65-66, replace "having or more holes" with --having one or more holes--.

Signed and Sealed this
Twenty-first Day of November, 2023

Katherine Kelly Vidal
Director of the United States Patent and Trademark Office